United States Patent [19]

Hulsing

[11] Patent Number: 4,782,700
[45] Date of Patent: Nov. 8, 1988

[54] FRAME ASSEMBLY AND DITHER DRIVE FOR A CORIOLIS RATE SENSOR

[75] Inventor: Rand H. Hulsing, Redmond, Wash.

[73] Assignee: Sundstrand Data Control, Inc., Redmond, Wash.

[21] Appl. No.: 75,039

[22] Filed: Jul. 17, 1987

[51] Int. Cl.[4] .................................................. G01P 3/46
[52] U.S. Cl. ......................................... 73/505; 73/510
[58] Field of Search ................ 73/517 AV, 505, 510, 73/514, 517 R

[56] References Cited

U.S. PATENT DOCUMENTS

| | | | |
|---|---|---|---|
| 4,445,376 | 5/1984 | Merhav | 73/510 |
| 4,510,802 | 4/1985 | Peters | 73/505 |
| 4,590,801 | 5/1986 | Merhav | 73/510 |
| 4,665,748 | 5/1987 | Peters | 73/505 |

Primary Examiner—Michael J. Tokar
Assistant Examiner—Robert P. Bell
Attorney, Agent, or Firm—Christensen, O'Connor, Johnson & Kindness

[57] ABSTRACT

An apparatus for producing signals indicative of both a Coriolis rate and an acceleration along a preferred axis while decoupling extraneous vibration and motion that would introduce errors into the signals, and a driving mechanism for vibrating the apparatus at a dither frequency. The apparatus includes a parallelogram frame (50) including two accelerometer support surfaces (24, 26) on which are mounted two accelerometers (20 and 22) having their sensitive axes in parallel alignment. The accelerometer support surfaces are connected to opposite ends of a flex member (52), which includes six flexures (32, 34, 36, 38, 40, 42) having parallel bending axes. Two of the flexures (34, 38) are disposed at opposite ends of one side of each flexure member, and have a "long" axis that is substantially parallel to the sensitive axes of the accelerometers and aligned with a line connecting their centers of percussion. The centers of mass of the accelerometers and their associated supporting surfaces are coincident with the centers of percussion, and are rigidly connected by the two flexures and by one side (30) of each flex member. This solid metal path between the centers of percussion minimizes common mode errors. A driving mechanism (64) is connected to the parallelogram frame and is opertive to drive the accelerometers at a desired frequency, causing them to vibrate back and forth in a direction substantially transverse to their sensitive axes. The driving mechanism includes a mounting plate (72) and a coil frame (66) on which are mounted two electromagnetic coils (70) having a "C" shaped core (80). The driving mechanism is mounted so that the core faces a pole piece (84) attached to the parallelogram frame and its moment of inertia is trimmed to equal that of the parallelogram frame. It is connected to the parallelogram by a link (88) and provides a reactionless driving force.

14 Claims, 5 Drawing Sheets

FRAME ASSEMBLY AND DITHER DRIVE FOR A CORIOLIS RATE SENSOR

TECHNICAL FIELD

This invention generally pertains to a Coriolis rate sensor, and more particularly, to a parallelogram frame used in such a sensor and a drive mechanism for vibrating the parallelogram frame.

BACKGROUND INFORMATION

Angular rate of rotation about a given coordinate axis may be measured by moving (e.g., vibrating) an accelerometer along an axis normal to the accelerometer's sensitive axis and normal to the rate axis about which rotation is to be measured. For example, consider a set of X, Y, Z coordinate axes fixed in a body whose rotation rate is to be measured, and an accelerometer also fixed in the body with its sensitive axis aligned along the Z axis. If the angular rotation vector of the body includes a component along the X axis, then periodic motion of the accelerometer along the Y axis will result in a periodic Coriolis acceleration acting in the Z direction that will be sensed by the accelerometer. The magnitude of the Coriolis acceleration is proportional to the velocity along the Y axis and the rotation rate about the X axis. As a result, the output of the accelerometer includes a DC or slowly changing component that represents the linear acceleration of the body along the Z axis, and a periodic component that represents the rotation of the body about the X axis. The accelerometer output can be processed, along with the outputs of accelerometers that have their sensitive axes in the X and Y directions and that are moved along the Z and X axes, respectively, to yield linear acceleration and angular rate about the X, Y and Z axes. Such signal processing is described in U.S. Pat. Nos. 4,445,376 and 4,590,801.

As described in U.S. Pat. No. 4,590,801, one preferred embodiment of a rotation rate sensor comprises, for each axis, two accelerometers oriented with their sensitive axes parallel or antiparallel to one another, and means for dithering (i.e., vibrating) the accelerometers along an axis normal to their sensitive axes. A suitable method for mounting such accelerometer pairs is described in U.S. Pat. No. 4,510,802. A side view of a structure shown in FIG. 3 of that patent illustrates a mount for two accelerometers centered on mounting surfaces at the top and at the bottom of a parallelogram frame. The side of the parallelogram frame shown in the figure includes six pivots, comprising thin metal flexures aligned with their bending axes in parallel, one of the flexures being disposed at each of the four corners and at the centers of the vertical sides of the parallelogram frame.

Prior designs for rotation rate sensors like the one briefly described above have been subject to problems associated with dynamic imbalance of the parallelogram structure, and the sensitivity of the structure to vibration occurring in a direction other than parallel to the axis along which they are dithered. For example, if the parallelogram frame just described is subjected to a vibration along an axis parallel with the sensitive axes of the accelerometers, both accelerometers should experience a common mode force, and produce an equal, though opposite, output that cancels in the angular rate channel. However, due to the transverse (i.e., cross axis) flexibility of the thin metal flexures and of the supporting surfaces on which the accelerometers are mounted, the same vibrational movement is not applied to the two accelerometers. Any structural resonance in the frame may exacerbate this problem. As a result, the output signal produced by the rate sensor includes an error in the angular rate channel that is proportional to the difference in the nominal common mode vibration to which the accelerometers are subjected.

The prior art driving mechanism used to provide the dither motion or vibration along an axis transverse to the sensitive axes of the accelerometers is typically disposed adjacent one side of the parallelogram frame. Due to an inequality of mass distribution (or moment of inertia) between the driving mechanism and the parallelogram frame, the parallelogram frame may experience an imbalanced torque when both the frame and driving mechanism are subjected to a vibration directed parallel to the accelerometer sensitive axes. In addition differences in the moment of inertia of the driving mechanism and the parallelogram frame may cause a variation in the driving force applied to the frame, when it is subjected to an angular vibration about its rotation sensitive axis. Either of these two effects may result in a substantial error in the angular rate channel signal.

SUMMARY OF THE INVENTION

The present invention is directed to a Coriolis rate sensor apparatus in which extraneous motion or vibration that might tend to introduce errors in the output signal produced by the rate sensor is either decoupled or canceled. A further aspect of the invention is directed to a driving mechanism for vibrating the Coriolis rate sensor frame.

A Coriolis rate sensor constructed according to the present invention includes a parallelogram frame having two accelerometer support surfaces attached to opposite ends of a flex member. The flex member includes six flexures having parallel bending axes. Two of the flexures that are disposed at opposite ends of one side of the flexure member have a cross axis that is substantially parallel to the accelerometer support surfaces.

An accelerometer is mounted on each of the accelerometer support surfaces, having a preferred axis for sensing acceleration that is aligned with one of the two flexures. In addition, each of the accelerometers is disposed so that its center of percussion is rigidly connected to the center of percussion of the other accelerometer by the two flexures and the one side of the flex member.

Driving means are disposed adjacent the parallelogram frame and are operative to drive the accelerometers at a desired frequency, causing the accelerometers to vibrate back and forth in a direction substantially transverse to their preferred axes as the parallelogram frame pivots at each flexure. The driving means and the parallelogram frame possess certain characteristics which tend to decouple or cancel extraneous motion. For example, the moment of inertia of the driving means is made equal to the combined moment of inertia of the parallelogram frame and the accelerometers. In addition, the center of gravity associated with each accelerometer support surface and the accelerometer mounted thereon is coincident with the center of percussion of that accelerometer and the centers of gravity are rigidly connected to each other by the aligned flexures and by one side of the flex member in the same manner as the centers of percussion.

The parallelogram frame includes a base plate disposed generally at its center. A cross bar that extends from one side of the flex member to the other side connects to the base plate and is adapted to connect to the supporting structure. Each end of the cross bar is connected to a side of the flex member by one of the flexures. The moment of one side of the flex member about the bending axis of the flexure connecting the cross bar to that side equals the moment of the other side of the flex member about the bending axis of the flexure connecting the cross bar to the other side. Thus, the parallelogram frame is not subjected to a rotational torque due to a vibrational component directed parallel to the preferred axes of the accelerometers. In addition, the parallelogram frame is substantially symmetrical in both shape and mass about a central plane defined by the center of the base plate that extends through the frame intermediate both accelerometers and transverse to their preferred axes. Therefore, the parallelogram frame is not subjected to a rotational torque due to any vibrational component directed transversely to the preferred axes of the accelerometers and parallel to the bending axes of the flexures.

The parallelogram frame is also substantially symmetrical in both shape and mass about a plane that extends through the centers of percussion of the accelerometers, and transverse to the bending axes of the flexures. Consequently, the frame is dynamically balanced with respect to the back and forth vibration that is provided by the driving means. A solid link connects the driving means and the parallelogram frame. Consequently, any angular vibration about the rotation sensitive axis acting on one of the parallelogram frame and the driving means also must act on the other through the link.

The parallelogram frame further includes a plurality of tuning straps disposed adjacent one side of the flex member. The tuning straps connect the accelerometer support surfaces to the base plate and are selected to have a stiffness which just balances the stiffness of the flexures. As a result, noncommon mode tilting rotations resulting from cross axis compliance of the flexures are eliminated, and the accelerometers are subjected only to a tilting rotation about their centers of percussion.

The drive mechanism for the Coriolis rate sensor includes a support plate having means for attaching the support plate to a supporting structure in a position adjacent the Coriolis rate sensor. A coil frame is provided in which is mounted an electromagnetic coil. The coil frame is connected to the support plate along a flexure having a bending axis about which the coil frame may pivotally deflect. On the electromagnetic coil is disposed a core face that is proximate to and facing toward a corresponding pole face of a pole piece mounted on the Coriolis rate sensor. When a power supply is connected to energize the electromagnetic coil, the core face and its corresponding pole face are attracted toward each other.

DISCLOSURE OF THE PREFERRED EMBODIMENTS

Figure 1:
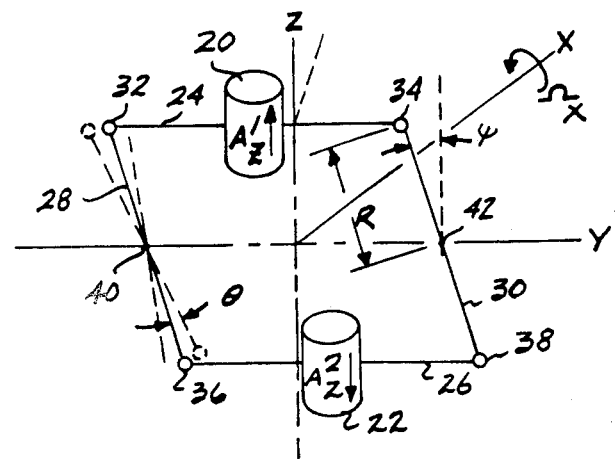
FIG. 1 is a diagram conceptually illustrating a parallelogram frame assembly in which two accelerometers are mounted and are vibrated along an axis transverse to their preferred (i.e., sensitive) axes.

FIG. 1 schematically illustrates a parallelogram arrangement for vibrating accelerometers 20 and 22 along the Y axis. The accelerometers are mounted with their sensitive axes substantially parallel to the Z axis and anti-parallel to one another, the sensitive axis of accelerometer 20 being directed in a positive direction along the Z axis and the sensitive axis of accelerometer 22 being directed in a negative direction along the Z axis. Accelerometers 20 and 22 are secured to accelerometer support members 24 and 26, respectively, which in turn are connected to a pair of linkage members 28 and 30 by pivots 32 through 38. Linkage members 28 and 30 are mounted at central pivots 40 and 42, respectively. Support members 24 and 26 are both parallel to the Y axis. When linkage members 28 and 30 are vibrated about central pivots 40 and 42, respectively, through angles $\pm\theta$, accelerometers 20 and 22 will vibrate along the Y axis with an amplitude approximately equal to $\pm R\theta$ where R represents the length of the linkage arm 28 or 30 measured from one of the central pivots 40 or 42 to one of the other pivots 32 through 38. In FIG. 1, the angle $\psi$ represents an initial offset (with respect to the Z axis) about which such vibration occurs.

When a sinusoidal drive force is applied to the arrangement shown in FIG. 1, the accelerations along the Y and Z axes resulting from the motion of the accelerometers are as follows:

$$A_y = \omega^2 R\theta\cos\psi\sin\omega t \tag{1}$$

$$A_z = \omega^2 R\theta\sin\psi\sin\omega t + \omega^2 R\theta^2\cos\psi\cos 2\omega t \tag{2}$$

where $\omega$ represents the angular frequency of vibration through angle $\theta$. In equations (1) and (2) above, it is assumed that the driving force is proportional to sin$\omega$t, i.e., that the drive force is zero at time zero. The acceleration along the Z axis ($A_z$) of accelerometers 20 and 22 due to vibration by the mechanism illustrated in FIG. 1 is relatively small for small values of $\theta$ and $\psi$, and will essentially cancel out when the signal output from the accelerometers is processed. The motion of accelerometers 20 and 22 is therefore essentially linear along the Y axis for small angles of $\theta$ and $\psi$. The angular amplitude $\theta$ preferably has a value of 0.01 through 0.1 radians, and $\psi$ preferably has a value of less than 0.01 radians. Suitable values for the frequency $\omega$ are in the range of 200 through 1000 radians per second. Angular rotation $\Omega_x$ about the X axis (the rotation sensitive axis) produces a Coriolis force having an acceleration $A_z$ defined by equation (2).

Figure 12:
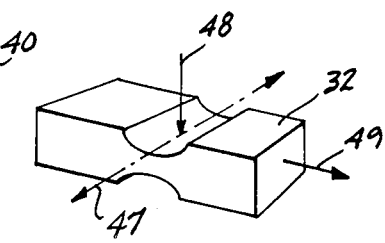
FIG. 12 illustrates a portion of a flexure in an isometric view identifying the three orthogonal axes associated with the flexure.

A preferred embodiment of an apparatus for implementing the vibrating parallelogram motion depicted graphically in FIG. 1 and a driving mechanism for driving the apparatus so that accelerometers mounted on the apparatus are vibrated back and forth, transverse to their sensitive axes, are shown in FIGS. 2 through 8. Initially, attention is directed to FIG. 3 wherein a side elevational view of a preferred embodiment of the invention is shown. Reference numeral 50 generally denotes a parallelogram frame including two accelerometer support surfaces 24 and 26 on which are respectively mounted accelerometers 20 and 22 (not shown in this Figure). Parallelogram frame 50 is preferably machined from a stainless steel having good flexural fatigue limit characteristics. Just as was graphically illustrated in FIG. 1, the parallelogram frame 50 shown in FIG. 3 includes four pivots at each of its four corners, defining a parallelogram comprising a flex member 52. The pivots are implemented in the preferred embodiment using thin circular arc metal flexures 32 through 38, each having three orthogonal axes. (For purposes of defining these axes, a representative portion of flexure 32 is shown in FIG. 12, wherein are identified a bending axis 47, a cross axis 48, and a longitudinal or "long" axis 49). Turning back to FIG. 3, flex member 52 further includes linking members 28 and 30 that extend between accelerometer support members 24 and 26. The centers of linking members 28 and 30 are connected by flexures 40 and 42 to a cross bar mounting tab 54. Cross bar mounting tab 54 extends outwardly from the generally planar surface of flex member 52 and includes a mounting hole 56 through which a bolt may be inserted to secure the parallelogram frame 50 to a supporting structure (not shown). The supporting structure would typically be a part of an object that is subject to angular motion and linear acceleration that the Coriolis rate sensor is intended to measure.

Each of flexures 32 through 42 includes a characteristic bending axis as defined above, which is transverse to the planar surface of flex member 52; however, the "long" axes of flexures 34 and 38 are oriented at 90° to the "long" axes of the other flexures, lying within a plane 58 that extends through the centers of percussion of both accelerometers 20 and 22, parallel to the bending axes of the flexures. Furthermore, accelerometers 20 and 22 are mounted on accelerometer support surfaces 24 and 26 so that within plane 58, the center of gravity of the combined mass of accelerometer 20, support surface 24, and associated counterweight 44 and electronic package 21 is coincident with the center of percussion of accelerometer 20, and the center of gravity of the combined mass of accelerometer 22, support surface 26, and the associated counterweight 44 and electronic package 25 is coincident with the center of percussion of accelerometer 22. The significance of the orientation and alignment of flexures 34 and 38 relative to the centers of percussion of the accelerometers and the centers of gravity of the accelerometers and their support surfaces will be discussed further hereinbelow.

Figure 2:
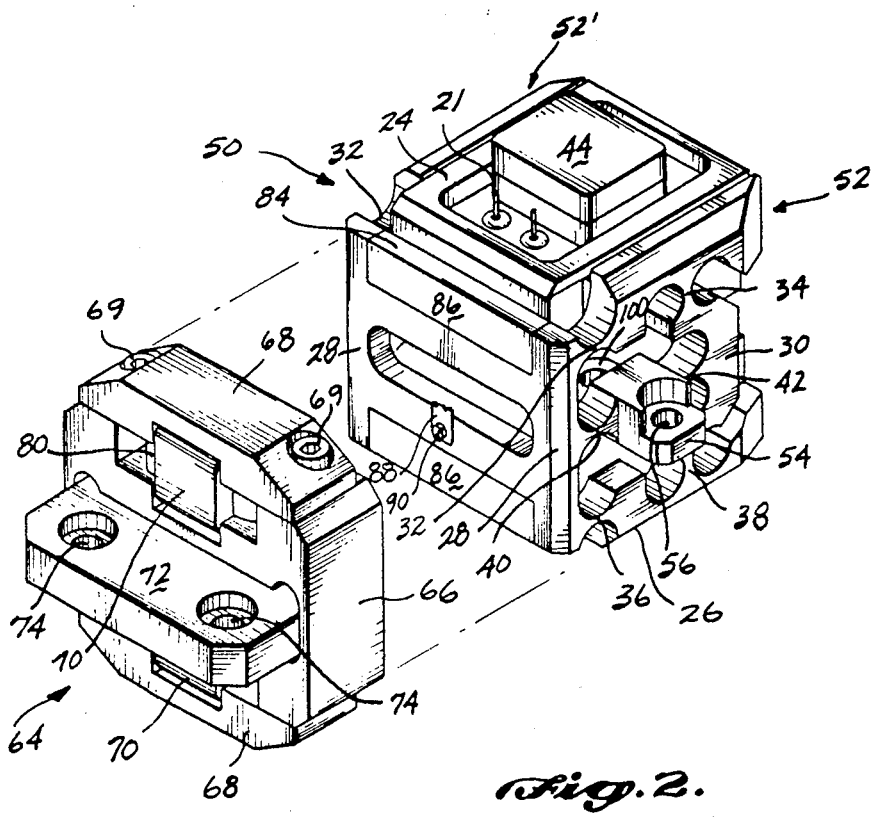
FIG. 2 is an isometric view showing a parallelogram frame for a Coriolis rate sensor and a driving mechanism for vibrating the parallelogram frame, wherein the driving mechanism has been separated from its normal mounting position adjacent the frame.
Figure 8:
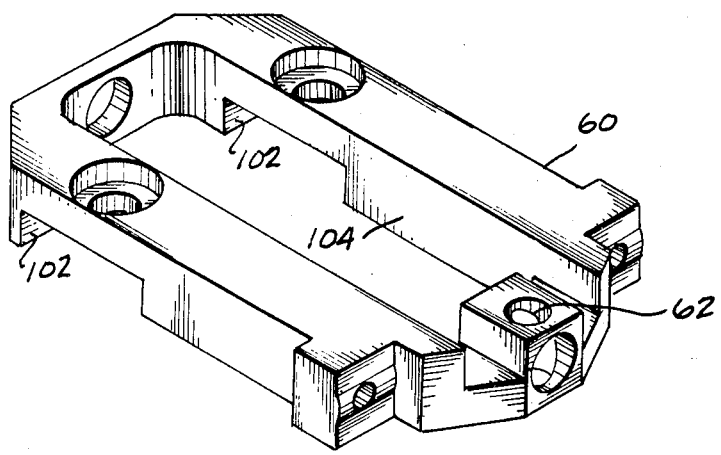
FIG. 8 is an isometric view of a base plate used in the parallelogram frame.

Referring now to FIG. 2, it will be apparent that parallelogram frame 50 is generally cubically shaped and includes a second flex member 52' which is substantially a mirror image of flex member 52, and is aligned parallel with it. Although much of the discussion that follows is directed to elements on flex member 52, e.g., flexures 32–42, it will be understood that flex member 52' includes substantially the same elements. A base plate 60 (as shown in FIG. 8) extends through the interior portion of parallelogram frame 50 between flex members 52 and 52' and includes two grooves 102, adapted to engage mounting tabs 100. Mounting tabs 100 project inwardly from cross bar mounting tabs 54, and are secured to the base plate by means of two bolts (not shown).

With continued reference to FIG. 2, a driving mechanism 64 is provided to vibrate accelerometers 20 and 22 back and forth, in a direction transverse to their sensitive axes. Driving mechanism 64 includes a coil frame 66 in which are mounted two electromagnetic coils 70. Coils 70 are held in place by coil clamping bars 68, which are disposed on the top and bottom of coil frame 66, and are connected thereto with bolts 69. A mounting plate 72 extends outwardly from the center of coil frame 66 and includes two mounting holes 74 for attachment to the supporting structure of the body on which the Coriolis rate sensor is mounted.

Figure 6:
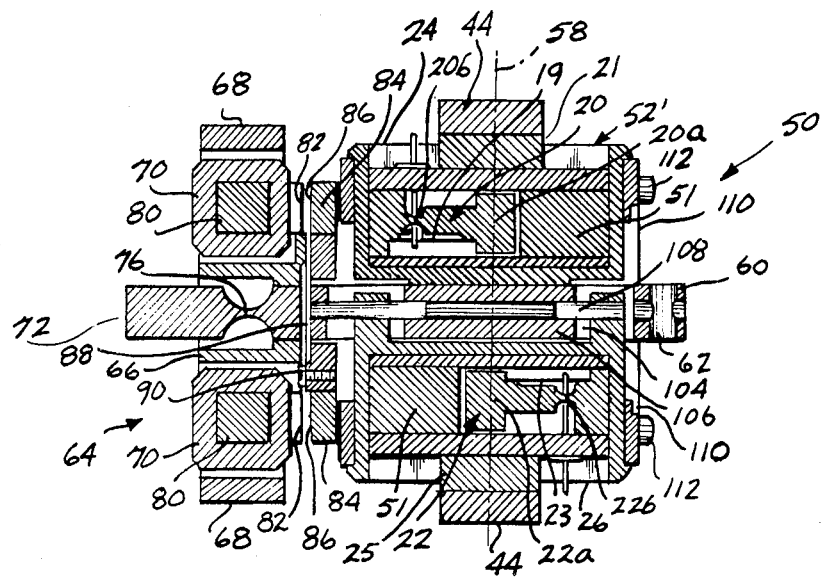
FIG. 6 is a cross sectional view taken along section line 6—6 of FIG. 4, illustrating the internal assembly of the Coriolis rate sensor.
Figure 7:
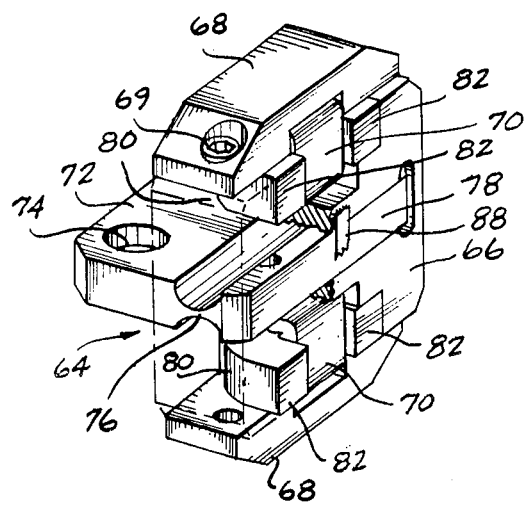
FIG. 7 is an isometric cut-away view of the driving mechanism comprising the present invention.

The opposite surface of driving mechanism 64 is shown in FIG. 7, wherein it can be seen that mounting plate 72 is attached to a pivot plate 78 by means of a thin metal flexure 76. Pivot plate 78 is mounted within coil frame 66 so that both the pivot plate and the coil frame are free to pivot about the bending axis of flexure 76 relative to mounting plate 72. Electromagnetic coils 70 are each associated with a generally "C" shaped core 80, the ends of which include two core faces 82 that face toward parallelogram frame 50. Core faces 82 are slightly beveled so that their innermost edges extend outwardly slightly more than their outermost edges (as will be apparent from the exaggerated illustration in FIGS. 3 and 6).

As shown in FIG. 2, two pole pieces 84 are mounted in a notch formed within parallelogram frame 50, and are each disposed proximate to the core faces 82 of one of the electromagnetic coils 70. Each of pole pieces 84 have a pole face 86, which is also slightly beveled so that its innermost edge extends outwardly more than its outermost edge. The significance of the beveled angle of core faces 82 and pole faces 86 will be explained below.

Figure 3:
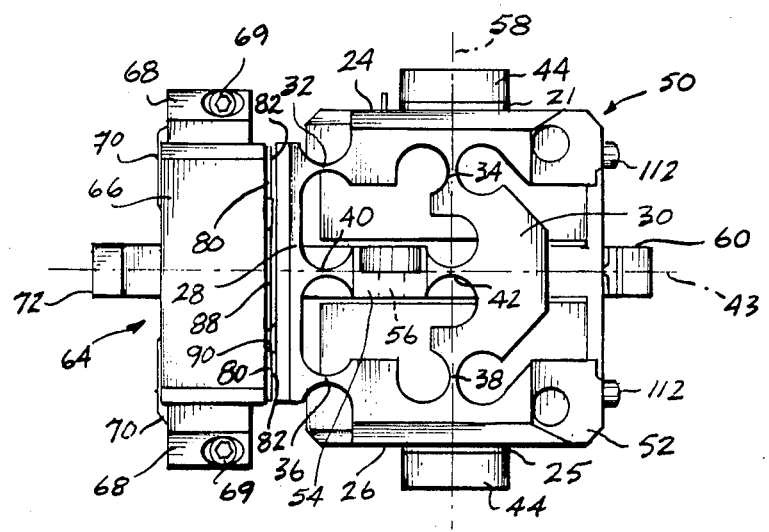
FIG. 3 is a side elevational view of a Coriolis rate sensor including a parallelogram frame and a driving mechanism in accordance with the present invention.

Referring to FIG. 3, it can be seen that driving mechanism 64 is connected to parallelogram frame 50 by a thin sheet metal link 88 (shown with opposite ends broken away in FIGS. 2 and 7). One end of the link is attached to parallelogram frame 50 with a bolt 90, while the other end is fixedly attached to coil frame 66, e.g., by spot welding. Electromagnetic coils 70 are alternately energized with a sinusoidal current provided by a power supply (not shown), creating an attractive force between first one and then the other of cores 80 and pole pieces 84. The alternating magnetic attraction between cores 80 and pole pieces 84 causes parallelogram frame 50 to vibrate, moving accelerometers 20 and 22 laterally back and forth as indicated in FIG. 1. Link 88 forces coil frame 66 and parallelogram frame 50 to pivot back and forth exactly out of phase, although normally, the link is not required to transmit any force between the two frames unless the Coriolis rate sensor is subjected to an angular vibration about its rotation sensitive axis.

As will be apparent from FIG. 3, a plane 43 through the center of mounting plate 72 and base plate 60 also passes through the center of flexures 40 and 42, dividing both the driving mechanism 64 and the parallelogram frame 50 vertically into two substantially symmetrical halves. Front-to-back symmetry in driving mechanism 64 and parallelogram frame 50 is evident about a plane 92 shown in FIG. 4; this plane extends through the center of percussion 46 of both accelerometers 20 and 22, bisecting parallelogram frame 50 and driving mechanism 64. Thus, relative to the views of FIGS. 3 and 4, parallelogram frame 50 and driving mechanism 64 have both vertical and front-to-back symmetry. The importance of the symmetrical distribution of these structures will be evident in the discussion that follows.

Turning to FIG. 6, a cross sectional view of the parallelogram frame 50 and driving mechanism 64 illustrates details of the accelerometers 20 and 22 and shows the disposition of a linear variable differential transformer (LVDT) 106 which is mounted within a channel 104 of base plate 60 (see FIG. 8). The LVDT 106 is cylindrical in shape, and is suitably attached to the upper portion of parallelogram frame 50 so that it moves with accelerometer 20 as the parallelogram frame is vibrated from left to right. An LVDT core 108 extends through the center of LVDT 106, is connected at each end to the lower portion of parallelogram frame 50, and moves with accelerometer 22 as it vibrates from left to right. The relative motion of LVDT core 108 and LVDT 106 thus produces an electrical signal proportional to the vibrational displacement of accelerometers 20 and 22 that is used by a servo control (not shown) to control the sinusoidal electrical current energizing electromagnetic coils 70.

Accelerometer 20 includes a proof mass 20a suspended to pivot about a flexure 20b. One end of a crystal 19 is attached to the proof mass so that acceleration along the sensitive axis changes the tension applied to the crystal, modulating its resonant frequency. Accelerometer 22 likewise includes a crystal 23 and a proof mass 22a, which pivots about a flexure 22b. Counterweights 51 are provided for each proof mass 20a and 22a and are disposed inside the parallelogram frame 50, adjacent the accelerometers on opposite sides of plane 58. FIG. 6 clearly shows how plane 58 connects the centers of percussion of the two accelerometers 20 and 22, passing through their proof masses 20a and 22a.

Figure 5:
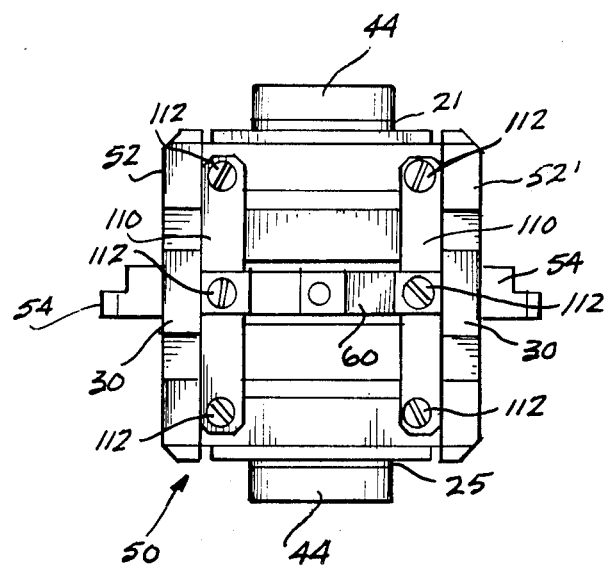
FIG. 5 is an end elevational view of the Coriolis rate sensor of FIGS. 3 and 4.

Finally, with reference to FIG. 5, an end of parallelogram frame 50 opposite that to which the vibrational driving force is applied by driving mechanism 64 is shown to disclose the disposition of tuning straps 110. Tuning straps 110 are relatively thin metal strips which are connected by bolts 112 between the accelerometer support surfaces 24 and 26 and base plate 60, and are used to off-set the stiffness of flexure 40 as will be apparent from the discussion that follows below.

OPERATIONAL ADVANTAGES OF THE INVENTION

The design of parallelogram frame 50 is intended to avoid errors in the output signal produced by accelerometers 20 and 22 that may result from vibration in a direction aligned with their sensitive axes. Flexures 34 and 38 are oriented so that their "long" axis lies in plane 58, parallel with a line connecting the centers of percussion of accelerometers 20 and 22. The flexures are extremely stiff along their long axis (having a compression yield strength greater than 200,000 lbs./sq. inch), thus providing a substantially solid metal path connecting the accelerometers between their centers of percussion. Any vibration directed in alignment with plane 58 and with the sensitive axis is applied equally to the accelerometers through the linkage member 30 because of the orientation of flexures 34 and 38, so that both accelerometers 20 and 22 experience the same common mode input. As a result, common mode vibration cancels in the Coriolis rate channel. In addition, the stiffness presented by flexures 34 and 38 aligned as shown in FIG. 3 raises the natural frequency of parallelogram frame 50 to a relatively high value, e.g., six kiloHertz or higher. Because flexures 34 and 38 are commonly aligned on a plane with the centers of gravity of each accelerometer and its associated mass and the centers of percussion of the accelerometers 20 and 22, vibrations directed in alignment with the sensitive axes of the accelerometers will not produce a torque that might tend to produce false angular rate errors in the accelerometer output signals, and will not promote a resonant response in the parallelogram frame 50.

Flexures 32 and 36 are oriented so that their relatively stiff long axes directly transmit the driving force provided by drive mechanism 64 into the centers of gravity of the combined mass of the accelerometers and their mounting surfaces, and the force centers of the driving force providing by each core 80 and pole piece 84 pair is generally aligned with these flexures. The location of the centers of gravity of the accelerometers 20 and 22 and their mounting surfaces 24 and 26 is adjusted by adding an appropriate counter weight 44 on each electronic package 21 and 25 and appropriate counterweights 51 inside the parallelogram frame 50, so that the center of gravity of each accelerometer and its associated mass lies in alignment with one of flexures 32 and 36. Alignment of the centers of gravity with the force center through flexures 32 and 36 reduces excitation of parallelogram frame 50 by eliminating extraneous cross axial force (other than the force provided by driving mechanism 64 to dither accelerometers 20 and 22).

The shape and size of linkage member 30 was selected to provide the same mass balance as linkage member 28. Using a reiterative computer algorithm, the shape of linkage member 30 was successively adjusted so that the product of the distance between the bending axis of flexure 42 and each mass element of linkage member 30, when integrated, resulted in a moment equal to the moment of linkage member 28 computed in a similar fashion. Consequently, parallelogram frame 50 is balanced with respect to vibrations directed in alignment with the sensitive axis. The torque on linkage members 28 and 30 arising from application of a vibrational force acting in a direction aligned with the sensitive axes of the accelerometers is matched and therefore cancels.

As previously mentioned, the parallelogram frame 50 and driver mechanism 64 are symmetrical in mass and shape about a plane 43 extending (horizontally as shown in FIG. 3) through base plate 60. As a result, the Coriolis rate sensor is insensitive to extraneous linear vibration directed in alignment with plane 43 (other than the dither vibration).

Figure 4:
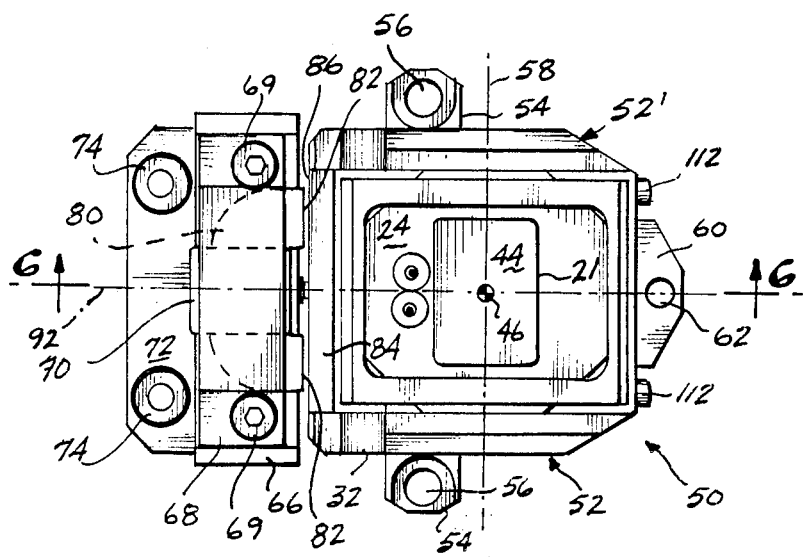
FIG. 4 is a top plan view of the Coriolis rate sensor shown in FIG. 3.

As noted with respect to plane 92 shown in FIG. 4, both the driving mechanism 64 and parallelogram frame 50 are symmetrical in mass and shape, and this front-to-back symmetry coupled with the vertical symmetry just described inherently dynamically balances the Coriolis rate sensor, preventing the driving force provided by driving mechanism 64 or any other external force applied in alignment therewith from producing a torque due to imbalance that would otherwise tend to cause the parallelogram frame 50 to roll.

The moment of inertia of driving mechanism 64 is adjusted to equal the moment of inertia of the parallelogram frame 50 with attached accelerometers 20 and 22, by trimming the weight of coil clamping bars 68. Since the coil frame 66 and parallelogram frame 50 rock back and forth exactly out of phase, driving mechanism 64 does not produce any net reaction into base plate 60, mounting plate 72, or into the supporting structure to which they are attached.

Driving mechanism 64 and parallelogram frame 50 are also insensitive to angular vibrations. Partly, this is due to their symmetry about the horizontal and vertical axes, i.e., about planes 43 and 92, and partly because they are trimmed to have equal moments of inertia. In addition, link 88, which extends between coil frame 66 and parallelogram frame 50 insures that any angular torque acting on either the coil frame 66 or the parallelogram frame 50 is transmitted through the link to the other frame. Therefore, the back and forth vibration motion of the parallelogram frame 50 and the driving mechanism 64 remains unaffected by base angular vibration of the Coriolis rate sensor about its rotation sensitive axis, (the X axis in FIG. 1).

Referring back to FIG. 1, it will be apparent that as the parallelogram frame flexes under the driving force provided by driving mechanism 64, the accelerometer supporting surfaces 24 and 26 on which accelerometers 20 and 22 are mounted tend to tilt slightly or to rotate about the angular rate axis, X, due to cross axis compliance in the flexures 32, 34, 36, 38, 40 and 42. Since the Coriolis rate sensor uses linear accelerometers, the tilt experienced by accelerometers 20 and 22 depends upon the location of the center of rotation. However, by controlling the center of rotation of the accelerometers so that it is coaligned with the line connecting the accelerometers' centers of percussion, a simple balance condition pertains.

Figure 9:
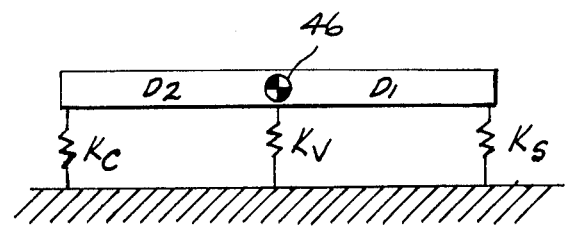
FIG. 9 is a graphic representation of a simplified model illustrating the use of tuning straps to off-set a spring stiffness associated with flexures used in the parallelogram frame.

A much simplified model representing a force balance condition as applied to the rotation of one of the accelerometers is represented in FIG. 9. As shown therein, the center of rotation is made coincident with the center of percussion 46 of the accelerometer so that only two forces are active to rotate the accelerometer mounting surface—the cross axis compliance of flexure 40, $K_c$, and an added tuning force, $K_s$. The force $K_s$ is adjusted so that the product $K_s$ times $D_1$ equals the product $K_c$ times $D_2$, where $D_2$ equals the distance between the center of rotation and flexure 32 (or 36), and $D_1$ equals a distance between the center of rotation and the point at which a force $K_s$ is applied to accelerometer mounting surface 24 (or 26). By making the two products equal, the contribution of a force $K_v$, which is equal to the cross axis stiffness of flexure 42, is eliminated from the equation. The force $K_s$ is provided by connecting four tuning straps 110 between the accelerometer support surfaces 24 and 26 and base 60, having the required stiffness, $K_s$, to produce the "force times distance" equality described above. When this condition is achieved, accelerometers 20 and 22 sense only a very small common mode centrifugal force at twice the dither frequency, which cancels during the processing of the angular rate signal.

Figure 10:
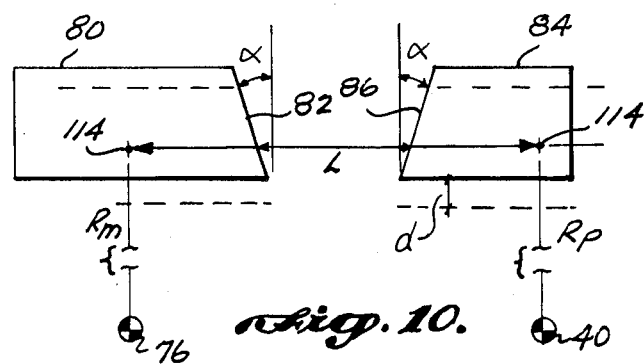
FIG. 10 is a graphic side view of an electromagnet core and a pole piece used in the driving mechanism showing in an exaggerated fashion the bevel applied to the core face and the pole face to maintain the center of force between the two in a constant position as the two faces tilt toward each other.
Figure 11:
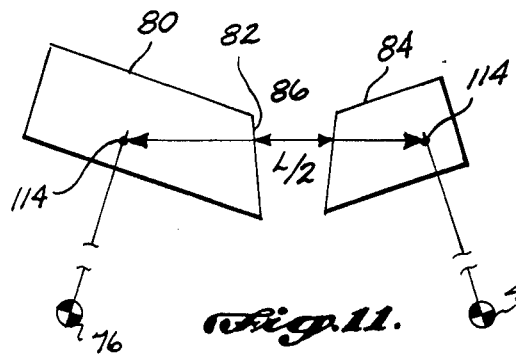
FIG. 11 shows the graphic illustration of the core face and pole face of FIG. 10, when the two are tilted toward each other.

Driving mechanism 64 provides an electromagnetic attraction between cores 80 and pole pieces 84. This force is proportional to the square of the reciprocal of the distance between the core face 82 and pole face 86. As shown in a greatly exaggerated fashion in FIG. 10, both core face 82 and pole face 86 are beveled at an angle $\alpha$. When electromagnetic coils 70 are energized, an attractive force is generated between force centers 114 along a line, L, causing coil frame 66 to pivot about flexure 76 and parallelogram frame 50 to pivot about flexures 32 through 42, and in particular, flexure 40. Force center 114 within core 80 is located at a radius $R_m$ from flexure 76, while force center 114 within pole piece 84 is located at a radius $R_p$ from flexure 40. As core face 82 and pole face 86 rock toward each other, they tilt and dip down. By properly selecting the tilt angle $\alpha$, force centers 114 are maintained at the junction of L and R. If the core face and pole face were not beveled, the center of force would be raised as the two faces rocked toward each other, because the gap between the core and pole faces would be smaller near the top than at the bottom. This effect is offset by beveling the faces at the angle $\alpha$ so that the change in force center that would occur due to the dipping of the core and pole piece is just offset by the change resulting from the beveled faces. To maintain the force center between core 80 and pole piece 84 in alignment with the flexures 32 and 36, the core 80 and pole piece 86 are shifted by the distance d, thereby offsetting the change in the position of the force centers resulting from beveling the core and pole piece faces 82 and 84, at the angle $\alpha$. As a result, the force centers 114 are always maintained in alignment with flexures 32 and 36.

While the present invention has been disclosed with respect to a preferred embodiment and modifications thereto, further modifications will be apparent to those of ordinary skill in the art within the scope of the claims that follow. It is not intended that the invention be limited by the disclosure, but instead that its scope be determined entirely by reference to the claims which follow hereinbelow.

The embodiments of the invention in which an exlusive property or privilege is claimed are defined as follows:

1. A frame for use in a Coriolis rate sensor including two accelerometers each having a preferred axis, comprising:

two accelerometer carriers disposed on opposite sides of the frame and adapted for mounting the two accelerometers with their preferred axes in alignment;

two substantially parallel flex members, each extending between the two accelerometer carriers at opposite sides thereof, the flex members each including a cross brace disposed at their center, adapted for attaching the frame to a supporting structure, and further including a plurality of flexures having parallel bending axes, the flexures being disposed at the corners of a parallelogram, with one of the flexures connecting two sides of the parallelogram at each corner and one of the flexures disposed at each end of the cross brace and connecting the centers of two sides of the parallelogram, the flexures at each end of one of said two sides of each flex member being oriented to provide maximum stiffness on a line between the two carriers and disposed so that when the two accelerometers are mounted on the carriers, the centers of mass of each carrier and the accelerometer mounted thereon are aligned with the flexures at each end of said one side.

2. The frame of claim 1 wherein for each flex member, the moment of said one side of the flex member about the bending axis of the flexure connecting the cross brace to said one side equals the moment of the other of said two sides of the flex member about the bending axis of the flexure connecting the cross brace to said other side, thereby preventing a rotational torque being applied to the frame as a result of a vibrational component directed parallel to the preferred axes of the accelerometers.

3. The frame of claim 1 further comprising a base plate disposed in the center of the frame and connected to a center portion of each of the cross braces, one end of the base plate being adapted to attach to the supporting structure.

4. The frame of claim 3 wherein the center of the base plate defines a central plane through the frame that is intermediate both carriers, and wherein the frame is substantially symmetrical in both shape and mass about said plane, preventing a rotational torque from being applied to the frame as a result of a vibrational component directed transversely to the preferred axes and parallel to the bending axes of the flexures.

5. The frame of claim 3 further comprising at least one tuning strap connecting the accelerometer carriers to the base plate, and selected to have a stiffness balancing a cross axis compliance associated with the flexures.

6. The frame of claim 1 wherein the frame is substantially symmetrical in both shape and mass about a plane that is equidistant from and intermediate the flex member, providing a dynamic balance.

7. The frame of claim 1 further comprising means adapted for magnetically and mechanically coupling the flex members to a driving mechanism operative to vibrate the accelerometers back and forth.

8. A frame for use in a Coriolis rate sensor having two accelerometers mounted with their preferred axes in alignment, comprising:
 (a) two accelerometer mounting pads disposed on opposite sides of the frame, each being adapted to mount one of the accelerometers so that their preferred axes are aligned;
 (b) parallelogram means for linking the accelerometer mounting pads in parallel alignment and including a plurality of flexures enabling the accelerometer mounting pads and accelerometers mounted thereon to vibrate back and forth in a direction transverse to their preferred axes;
 (c) attachment means for attaching a central portion of the frame to a supporting structure, the attachment means being pivotably connected to the parallelogram means by the plurality of flexures; and (d) common mode connection means for rigidly connecting the two accelerometer mounting pads along a path that is aligned with a line extending through a center of percussion associated with each accelerometer, the common mode connection means comprising a portion of the parallelogram means and including a plurality of flexures oriented in alignment with said path and differently than other of the flexures of the parallelogram means, the orientation insuring that both accelerometers are subjected to the same motion directed along their preferred axes.

9. The frame of claim 8 wherein the center of percussion associated with each accelerometer is coincident with a center of gravity associated with each mounting pad and accelerometer, and wherein the centers of gravity of the accelerometers are rigidly connected by the common mode connection means along said path.

10. The frame of claim 8 wherein the attachment means comprise a base plate connected to the supporting structure at one end and to a central portion of the parallelogram means adjacent the other end.

11. The frame of claim 8 wherein the frame is symmetrical both in shape and mass about two orthogonal planes extending through the center of the frame, one of which is aligned with the preferred axes of the accelerometers.

12. The frame of claim 11 wherein the parallelogram means are dynamically balanced.

13. The frame of claim 8 further comprising means for compensating a cross axis compliance associated with the flexures to eliminate an error signal resulting from a non-common mode rotational tilting of the accelerometers that would otherwise be produced when the accelerometers vibrate back and forth.

14. A frame for use in a Coriolis rate sensor including two accelerometers each having a preferred axis, comprising:
 two accelerometer carriers disposed on opposite sides of the frame and adapted for mounting the two accelerometers with their preferred axes in alignment;
 two substantially parallel flex members, each extending between the two accelerometer carriers at opposite sides thereof, the flex members each including a cross brace disposed at their center, adapted for attaching the frame to a supporting structure, and a plurality of flexures having parallel bending axes, the flexures being disposed so as to define a parallelogram, by connecting the sides of the parallelogram at each of the corners of the parallelogram and connecting the cross brace to the centers of two of the sides of the parallelogram that extend transversely between the accelerometer carriers, one of said two sides of the parallelogram including flexures at each end that are oriented to provide maximum stiffness on a line between the two carriers and disposed so that when the two accelerometers are mounted on the carriers, the centers of mass of each carrier and the accelerometer mounted thereon, and a center of percussion associated with each accelerometer, are aligned with the flexures at each end of said one side.

* * * * *